(12) United States Patent
Jin et al.

(10) Patent No.: US 7,570,976 B2
(45) Date of Patent: *Aug. 4, 2009

(54) METHODS AND APPARATUS FOR EXPEDITIOUSLY RELEASING NETWORK RESOURCES FOR A MOBILE STATION BASED ON LOW BATTERY AND LOST SIGNAL CONDITIONS

(75) Inventors: Xin Jin, Ottawa (CA); Muhammad Khaledul Islam, Ottawa (CA); Wen Zhao, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 223 days.

This patent is subject to a terminal disclaimer.

(21) Appl. No.: 11/553,862

(22) Filed: Oct. 27, 2006

(65) Prior Publication Data
US 2007/0049354 A1 Mar. 1, 2007

Related U.S. Application Data

(63) Continuation of application No. 10/845,876, filed on May 14, 2004, now Pat. No. 7,130,667.

(51) Int. Cl.
*H04M 1/38* (2006.01)
(52) U.S. Cl. ............... 455/574; 455/127.5; 455/127.1; 455/343.2
(58) Field of Classification Search ............. 455/574, 455/572, 573, 127.1–127.5, 343.1–343.6, 455/323
See application file for complete search history.

(56) References Cited

U.S. PATENT DOCUMENTS

| 5,603,095 | A | | 2/1997 | Uola |
| 5,870,685 | A | * | 2/1999 | Flynn ..................... 455/573 |
| 5,901,361 | A | | 5/1999 | Luong |
| 6,002,919 | A | | 12/1999 | Posti |

(Continued)

FOREIGN PATENT DOCUMENTS

| WO | 9826622 A2 | 6/1998 |
| WO | 0110152 A1 | 2/2001 |

OTHER PUBLICATIONS

European Search Report and Written Opinion for Application No.# 04252816.6, Dated Dec. 29, 2004.

(Continued)

*Primary Examiner*—Lester Kincaid
*Assistant Examiner*—Sayed T Zewari
(74) *Attorney, Agent, or Firm*—John J. Oskorep, Esq.

(57) ABSTRACT

Methods and apparatus for expeditiously releasing network resources for a mobile station based on low battery and lost signal conditions are disclosed. The wireless network (104) receives a power down warning message from the mobile station (102) indicative of a low battery condition. The wireless network (104) then identifies whether a lost signal condition exists with the mobile station (102). In response to receiving the power down warning message and subsequently identifying the lost signal condition, the wireless network (104) causes network resources for the mobile station to be released. The wireless network (104) infers that the mobile station (102) has powered down due to low battery without enough time to send a power down registration to the wireless network (104).

42 Claims, 4 Drawing Sheets

U.S. PATENT DOCUMENTS

| | | | |
|---|---|---|---|
| 6,032,040 A * | 2/2000 | Choy et al. | 455/414.1 |
| 6,345,180 B1 * | 2/2002 | Reichelt | 455/404.1 |
| 6,408,172 B1 | 6/2002 | Alperovich et al. | |
| 7,130,667 B2 * | 10/2006 | Jin et al. | 455/574 |
| 2001/0031626 A1 | 10/2001 | Lindskog et al. | |
| 2003/0144042 A1 | 7/2003 | Weinfield et al. | |
| 2004/0002366 A1 | 1/2004 | Cromer et al. | |

OTHER PUBLICATIONS

Jun. 8, 2005 Amendment for European Application Application # 04252816.6.

Radio Resource Management, The GSM System, XP-000860006.

EPO Article 96(2) Communication for EP Application # 04252816.6, Dated Mar. 12, 2007.

* cited by examiner

METHODS AND APPARATUS FOR EXPEDITIOUSLY RELEASING NETWORK RESOURCES FOR A MOBILE STATION BASED ON LOW BATTERY AND LOST SIGNAL CONDITIONS

CROSS-REFERENCE TO RELATED APPLICATION

This patent application is a continuation application of a U.S. patent application entitled "Methods And Apparatus For Expeditiously Releasing Network Resources For A Mobile Station Based On Low Battery And Lost Signal Conditions" having Ser. No. 10/845,876 and filing date of 14 May 2004, now U.S. Pat. No. 7,130,667, which is hereby incorporated by reference herein.

BACKGROUND

1. Field of the Invention

The present invention relates generally to mobile stations operating in a wireless communication network, and more particularly to methods and apparatus for expeditiously releasing network resources for a mobile station based on low battery and lost signal conditions.

2. Description of the Related Art

A wireless communication device, such as a mobile station operating in a wireless communication network, may provide for both voice telephony and data communications (e.g. IP packet data communications) for an end user. A mobile station may, for example, be compatible with $3^{rd}$ Generation (3G) communication standards (such as IS-2000 Release 0) and utilize Global System for Mobile Communications (GSM), Time Division Multiple Access (TDMA), or Code Division Multiple Access (CDMA) wireless network technologies.

Many mobile stations receive power from one or more batteries or battery packs which are connected to the mobile stations. In current CDMA-based wireless networks, at least some service providers require that a mobile station automatically power itself off before its battery charge reaches an "empty" condition. When a low battery condition is detected, the mobile station performs a power down procedure which is similar to the process that occurs when the mobile station is manually powered off by the end user. If the mobile station is in an "idle" state, the power down procedure includes generating an audible alert, sending a power down registration to the network on an access channel, and powering itself off. If the mobile station is in a "dormant" packet data session, the mobile station is required to setup a data call merely to tear down a Point-to-Point (PPP) session established with the network, terminates the call, send the power down registration, and power itself off. If the mobile station is in an "active" traffic channel call, the mobile station sends a release order message with power down registration on the traffic channel and powers itself off. Some alternative methods are also possible and in general, these methods may be referred to as conventional power down registration techniques.

The purpose of sending the power down registration before the mobile station powers itself down is to conserve network resources. After the receipt of the power down registration, the wireless network "knows" that the mobile station is unavailable and no longer requires service from the network. The wireless network knows, for example, that it is futile to page the mobile station for incoming calls when it is unavailable. In addition, the wireless network may release network resources such as an IP address and memory assigned to the mobile station when the mobile station is unavailable. This includes, for example, a Radio Access Network (RAN)-Packet Data Service Node (PDSN) binding or a Foreign Agent and Home Agent binding in a cdma2000™ network.

When the mobile station is in an "active" traffic channel call, which may be a voice, data, or other type of call, it is not always possible for the mobile station to adequately transmit a release order message with power down registration before an actual hardware power failure occurs due to the magnitude of the battery's voltage fluctuation. Given wide current fluctuations, the mobile's battery voltage may drop across both soft and hard "power-off" thresholds at nearly the same time and cause the transmitted signal to be lost. When the mobile station's battery condition becomes poor in an idle state or a dormant data packet session, the mobile station may also experience a hardware power failure before it completes the power down procedure due to access probe or traffic channel transmission activity.

The result may appear to the wireless network as a "call drop" due to reverse link fading. When this occurs, the wireless network does not expeditiously release network resources for the mobile station. Over a subsequent time period during which the mobile station is inoperable and unavailable, the wireless network continues to page the unreachable mobile station for incoming communications and fails to deassign and reallocate its previously-assigned network resources.

Accordingly, what are needed are methods and apparatus for expeditiously releasing network resources for a mobile station to overcome the deficiencies in the prior art.

SUMMARY

Methods and apparatus for expeditiously releasing network resources for a mobile station based on low battery and lost signal conditions are described herein. The wireless network receives a power down warning message from the mobile station indicative of a low battery condition. The wireless network then identifies whether a lost signal condition exists with the mobile station. In response to receiving the power down warning message and identifying the lost signal condition, the wireless network causes network resources for the mobile station to be released. The wireless network infers that the mobile station has powered down due to low battery without having enough time to successfully send a power down registration to the wireless network. Without use of techniques described herein, network resources for the mobile station remain allocated even though the mobile station is inoperable, which is sufficient and wasteful of network resources.

BRIEF DESCRIPTION OF THE DRAWINGS

Embodiments of present invention will not be described by way of example with reference to attached figures, wherein.

DETAILED DESCRIPTION OF THE PREFERRED EMBODIMENTS

Methods and apparatus for expeditiously releasing network resources for a mobile station based on low battery and lost signal conditions are described herein. The wireless network receives a power down warning message from the mobile station indicative of a lower battery condition. The wireless network then identifies whether a lost signal condition exists with the mobile station. In response to receiving the power down warning message and identifying the lost signal condition, the wireless network causes network resources for the mobile station to be released. The wireless network infers that the mobile station has powered down due to low battery without enough time to successfully send a power down registration to the wireless network. Without use of techniques described herein, network resources for the mobile station remain allocated even though the mobile station is inoperable, which is inefficient and wasteful of network resources.

Figure 1:
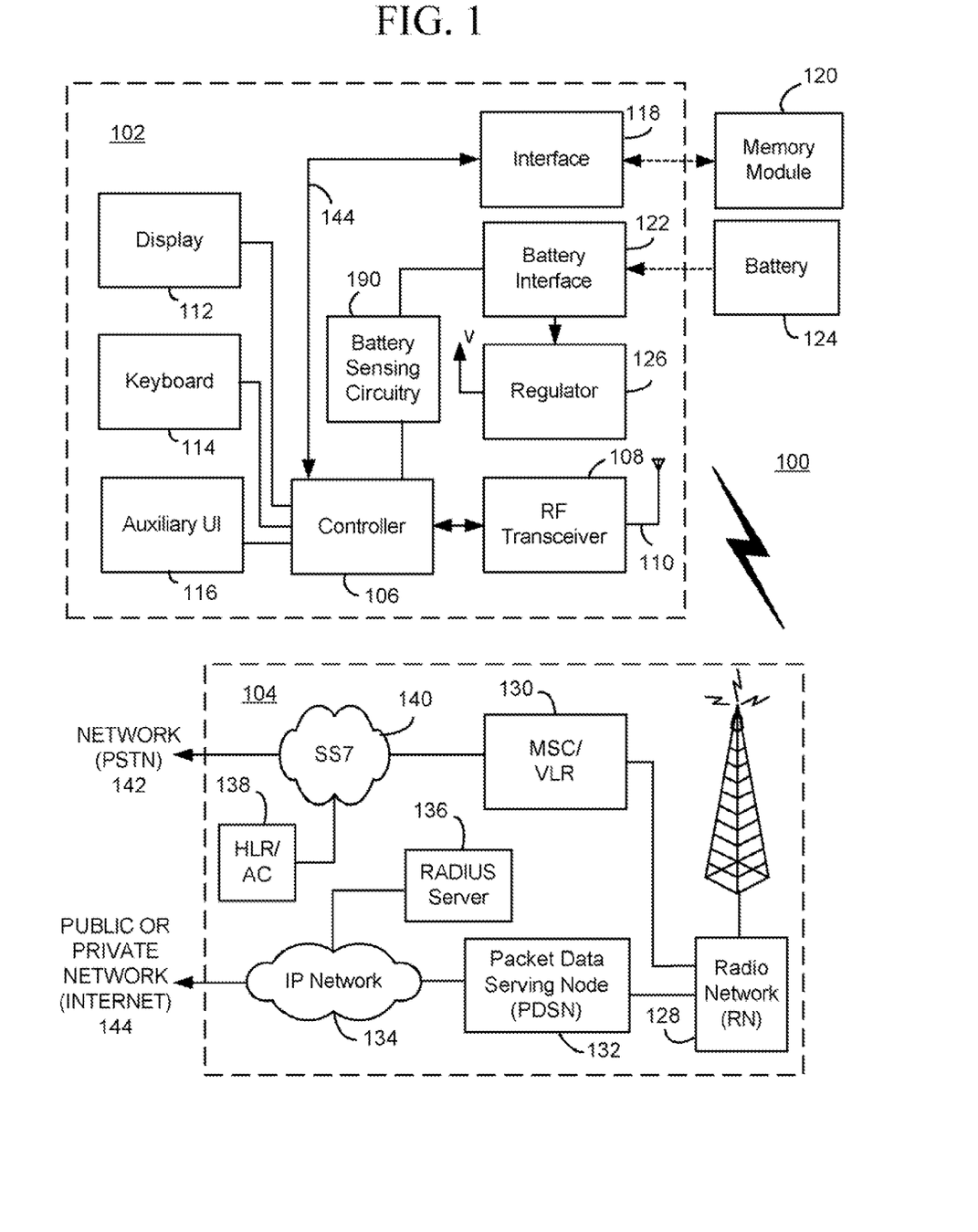
FIG. 1 is a block diagram which illustrates pertinent components of a mobile station and a wireless communication network.

FIG. 1 is a block diagram of a communication system 100, which includes a mobile station 102, which communicates through a wireless communication network 104. Mobile station 102 preferably includes a visual display 112, a keyboard 114, ad perhaps one or more auxiliary user interfaces (UI) 116, each of which is coupled to a controller 106. Controller 106 is also coupled to radio frequency (RF) transceiver circuitry 108 and an antenna 110. Typically, controller 106 is embodied as a central processing unit (CPU), which runs operating system software in a memory component (not shown). Controller 106 will normally control overall operation of mobile station 102, whereas signal-processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device, providing an output having a regulated voltage V. The output from battery interface 122 is further coupled to battery sensing circuitry 190 which helps monitor the condition of battery 124 with controller 106. Mobile station 102 also operates using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a third Generation (3G) supported network based on Code Division Multiple Access (CDMA) technologies. In particular, wireless network 104 is a cdma2000™ network which includes fixed network components coupled as shown in FIG. 1. Cdma2000™ is a trademark of the Telecommunications Industry Association (TIA). Wireless network 104 of the cdma2000-type includes a Radio Network (RN) 128, a Mobile Switching Center (MSC) 130, a Signaling System 7 (SS7) Network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 114 (such as the Internet).

During operation, mobile station 102 communicates with RN 128, which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from the mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. HLR/AC 138 may also authenticate mobile station 102 on system access. In order to provide packet data services to mobile station 102 in a cdma2000-based network, RN 128 communicates with PDSN 132. PDSN 132 provides access to the Internet 144 (or intranets, Wireless Application Protocol (WAP) servers, etc) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in the art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviors at the wireless link.

Figure 2:
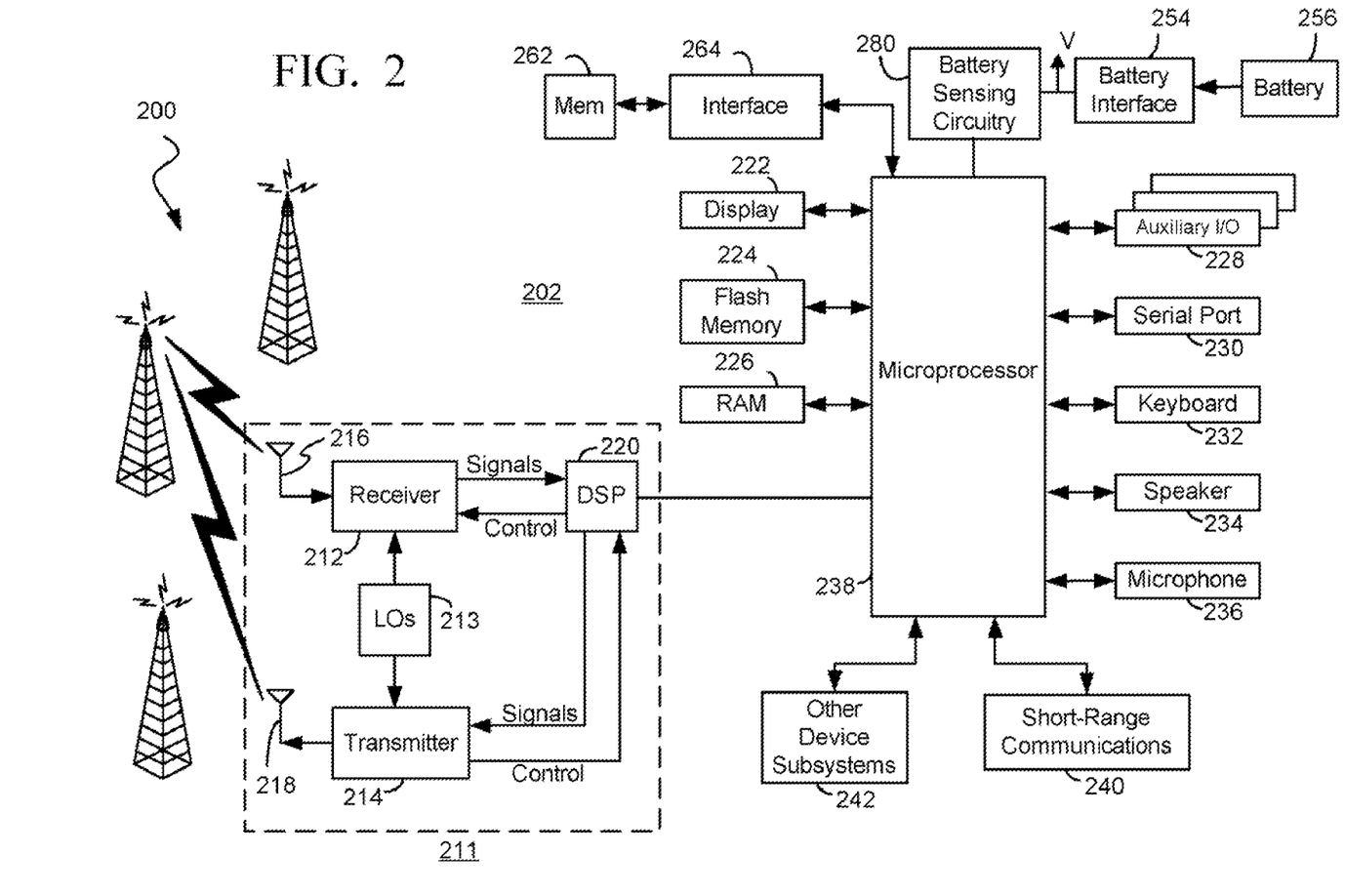
FIG. 2 is a more detailed diagram of a preferred mobile station of FIG. 1.

FIG. 2 is a detailed block diagram of a preferred mobile station 202 utilized in the present application. Mobile station 202 is preferably a two-way communication devices having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. OR Example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown) which regulates power to all of the circuitry, providing an output having a regulated voltage V. The output of the battery interface 254 is coupled to battery sensing circuitry 280 which helps monitor the condition of battery 256 using a microprocessor 238.

Microprocessor 238, which is one implementation of controller 106 of FIG. 1, controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications, which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on the mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to miroprocessor 238. Microprocessor 238 will preferably further process the signal for output to display 222 or alternatively to auxiliary I/O device 228. A user of mobile station 202 may also compose data items, such as e-mail message, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path, may, for example, be used to load an encryption key onto mobile station 202 through a direct and thus reliable and trusted connection to thereby provide secure device communication.

Short-range communications subsystem 240 of FIG. 2 is an additional optional component, which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
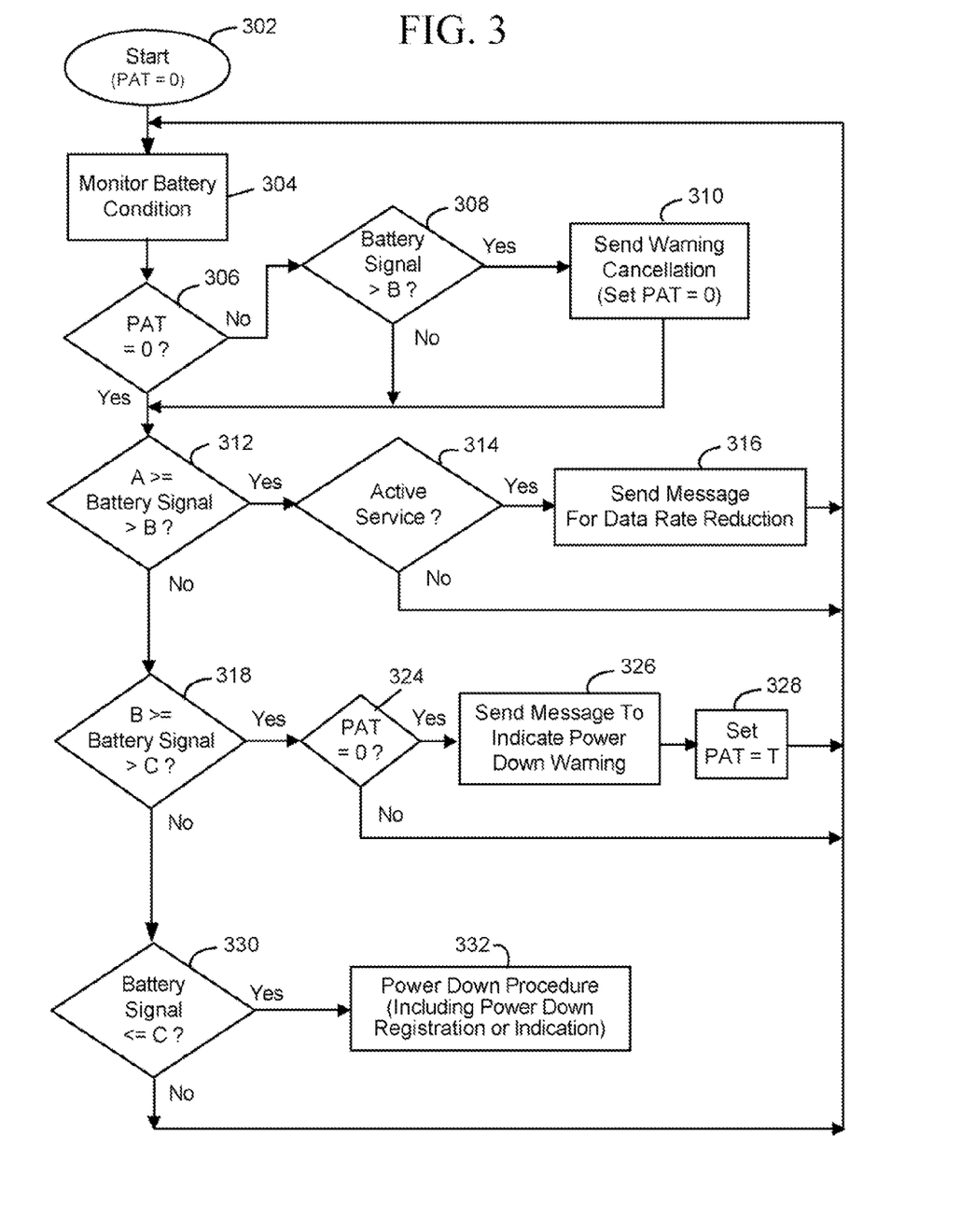
FIG. 3 is a flowchart for describing a method of expeditiously releasing network resources for a mobile station which is performed by the mobile station.

FIG. 3 is a flowchart for describing a method of expeditiously releasing network resources for a mobile station. The method of FIG. 3 may be performed by a mobile station, and is associated with the flowchart of FIG. 4 which describes a method performed by the wireless network. As described in relation to FIGS. 1-2, the mobile station may include a wireless transceiver, an antenna coupled to the wireless transceiver, one or more processors (e.g., a microprocessor and/or a DSP) having software instructions to perform the described method, a battery interface to provide coupling to one or more batteries which supply power to the mobile station, and battery sensing circuitry coupled to the battery interface and to the one or more processors to sense and report battery condition. A computer program product may include computer instructions stored on a computer storage medium (memory, a floppy disk or CD-ROM), which are written in accordance with the described logic.

Beginning at start block 302 of FIG. 3, a "PAT" timer is set to a zero initial value and disabled during an initialization procedure of the mobile station (e.g. after powering on the mobile station). The PAT timer is a timer which, when enabled, defines a time duration over which a power down warning remains valid in the wireless network. During operation, the mobile station monitors signals through its battery interface to identify any special battery conditions (step 304). In the present embodiment, the mobile station monitors three different battery conditions which are defined by three different thresholds A, B, and C, where A>B>C. The mobile station also monitors whether the PAT timer is zero (or close to zero) (step 306). If the PAT timer is not zero (nor close to zero) at step 306, the mobile station proceeds to step 308 which will be described later below.

If the PAT timer is zero (or close to zero) at step 306, the mobile station identifies whether a low battery condition exists where A≧Battery Signal>B (step 312). If the low battery condition exists at step 312, then the mobile station identifies whether one or more active services such as voice call or packet data call are being utilized by the mobile station (step 314). If no active service is being utilized as identified at step 314, then the mobile station continues to monitor the battery condition at step 304. If one or more active services are being utilized as identified at step 314, however, then the mobile station causes a control message for packet data rate reduction to be transmitted to the wireless network (step 316). Note that a lower transmission data rate conserves battery power at the mobile station. As some examples, the control message may cause a data rate for packet data communications to be reduced to 76.8 kbps from 153.6 kbps; or a data rate for voice communications to be reduced to 8 kbps from 13 kbps. The message may be sent only if the data rate is not reduced already or, alternatively, may be sent even if redundant to ensure that the data rate is kept low. The mobile station continues to monitor the battery condition starting again in the flowchart at step 304.

Although not explicitly detailed in FIG. 3, the mobile station may also send a control message for an increase in the packet data rate when the battery condition becomes acceptable (e.g. Battery Signal>A). This packet data rate increase adjusts the data rate for the one or more packet data services to its originally intended data rate. Conditions for a packet data rate increase may occur, for example, after the battery has been charged or the battery operating temperature becomes more favorable. The wireless network may alternatively increase the allowable packet data rate in response to an expiration of time during which no message for packet data rate reduction is received from the mobile station. Note that, in the embodiment of FIGS. 3-4, steps 312, 314 and 316 are optional.

Moving ahead in the flowchart of FIG. 3, if the low battery condition at step 312 is not identified, the mobile station identifies whether a different low battery condition exists where B≧Battery Signal>C (step 318). This low battery condition is more severe than that tested for in step 312. If such low battery condition is not identified in step 318, the mobile station proceeds to step 330 which will be described later below. If such low battery condition does exist at step 318, however, then the mobile station identifies whether the PAT timer is zero (or close to zero) (step 324). If the PAT timer is not zero (nor close to zero) at step 324, the mobile station continues monitoring the battery condition again at step 304.

If the PAT timer is zero (or close to zero) at step 324, the mobile station causes a control message to indicate a "power down warning" to be transmitted to the wireless network (step 326). The power down warning message is indicative of the low battery condition at the mobile station. This control message of step 326 is typically sent as an in-traffic channel message to the wireless network if the mobile station is involved in an on-going traffic call. Alternatively, the control message is sent over an access channel, an enhanced access channel, or a common control channel if there is no on-going traffic call involving the mobile station. The message may be in any suitable form and suitably named, for example, as a Power Down Warning message, a Low Battery Alert message, a Battery Status message which includes data identifying the lower battery condition, etc.

Regardless of the form or name, the power down warning message is used for causing the wireless network to release network resources for the mobile station if a lost signal condition with the mobile station is subsequently identified. A lost signal condition may be detected by the wireless network in a number of different ways. During a traffic call for the mobile station, a loss of the reverse link traffic signal over a persistent period of time (e.g. five seconds) is deemed to be a lost signal condition. In an idle or dormant operational state of the mobile station, no renewal or cancellation of the previous power down warning message being received within a predetermined time period is also deemed to be a lost signal condition.

The power down warning message is useful since the mobile station may power down without sufficient time to successfully transmit a conventional power down registration or indication due to insufficient power being received through its battery interface (i.e. a hardware power failure). Upon detecting a lost signal condition during a power down warning mode, the wireless network infers that the mobile station has unintentionally powered down due to low battery without adequate time to successfully send the power down registration/indication. When the wireless network causes network resources of the mobile station to be released, the mobile station is no longer available from the wireless network's perspective. The wireless network refrains from paging the mobile station when an incoming communication to the mobile station is received. Also, a previously-assigned IP address of the mobile station is deassigned from the mobile station and reallocated into the existing pool of available IP addresses. Thereafter, the mobile station will be required to send a power-up registration when it is back in operation with a recharged, recovered, and/or replaced battery.

Upon sending the power down registration message in step 326, the mobile station sets the PAT timer to a predetermined time period over which the current power down warning is valid, and starts running this timer (step 328). The value for the PAT timer may be included in a data field of the control message for receipt and use by the wireless network. Alternatively, a predetermined PAT timer value known to both the network and the mobile station may be used. Note that the mobile station will regularly cause a power down warning message to be sent to the wireless communication network within the predetermined time period defined by the PAT timer. Thus, the message may be a periodically or regularly transmitted message from the mobile station. If the wireless network does not receive a new or reissued power down warning message from the mobile station within the time period defined by the PAT timer, then a lost signal condition with the mobile station will be deemed to exist.

Note that the power down warning message should be transmitted to the wireless network slightly earlier than the expiration of the PAT timer so that it can arrive at and be processed by the network before it expires on the network side. Thus, the test condition at step 324 is "Yes" when a small value (close to zero) is identified.

Continuing on with the flowchart of FIG. 3, if the PAT timer is not zero (nor close to zero) at step 306, then the mobile station tests whether the Battery Signal>B. If the Battery Signal>B at step 306, then the battery of the mobile station has been recharged (or the temperature has improved) and therefore the mobile station sends a power down warning cancellation message to the wireless network (step 310). The warning cancellation message is for immediately canceling a previously-issued power down warning for the mobile station in the wireless network. When the warning cancellation message is sent, the PAT timer is set to zero and disabled at step 310. If the Battery Signal is ≦B as tested in step 308, the method continues at step 312 as described earlier above.

Continuing at step 318, if the low battery condition is not identified at step 318 then the mobile station identifies whether a yet different low battery condition exists where Battery Signal≦C (step 330). This low battery condition is even more severe than that tested for in step 318. If such low battery condition does not exist as identified at step 330, then the mobile station continues monitoring the battery condition back at step 304. If such low battery condition exists as identified at step 330, however, a power down procedure which includes the sending of a power down registration or indication to the wireless network is performed (step 332).

Although the mobile station is supposed to transmit the conventional power down registration or indication in step 332 in response to the low battery condition at step 330, the mobile station may unintentionally power down before it can transmit or adequately transmit such a message to the wireless network. This is more likely to occur during a call involving the mobile station where the transmitter power is relatively high. Even if transmitted, the power down registration may be unreliable during the low battery condition. Thus, the power down warning message of step 326 is particularly advantageous so that the wireless network may subsequently infer from a lost signal condition (e.g. lack of RF signal or from timeout without renewal or cancellation of warning) that the mobile station has powered down due to low battery without enough time to adequately send the power down registration. In response, the wireless network expeditiously releases network resources associated with the mobile station. Otherwise, the network resources for the mobile station remain allocated even though the mobile station is inoperable, which is inefficient and wasteful of network resources.

Figure 4:
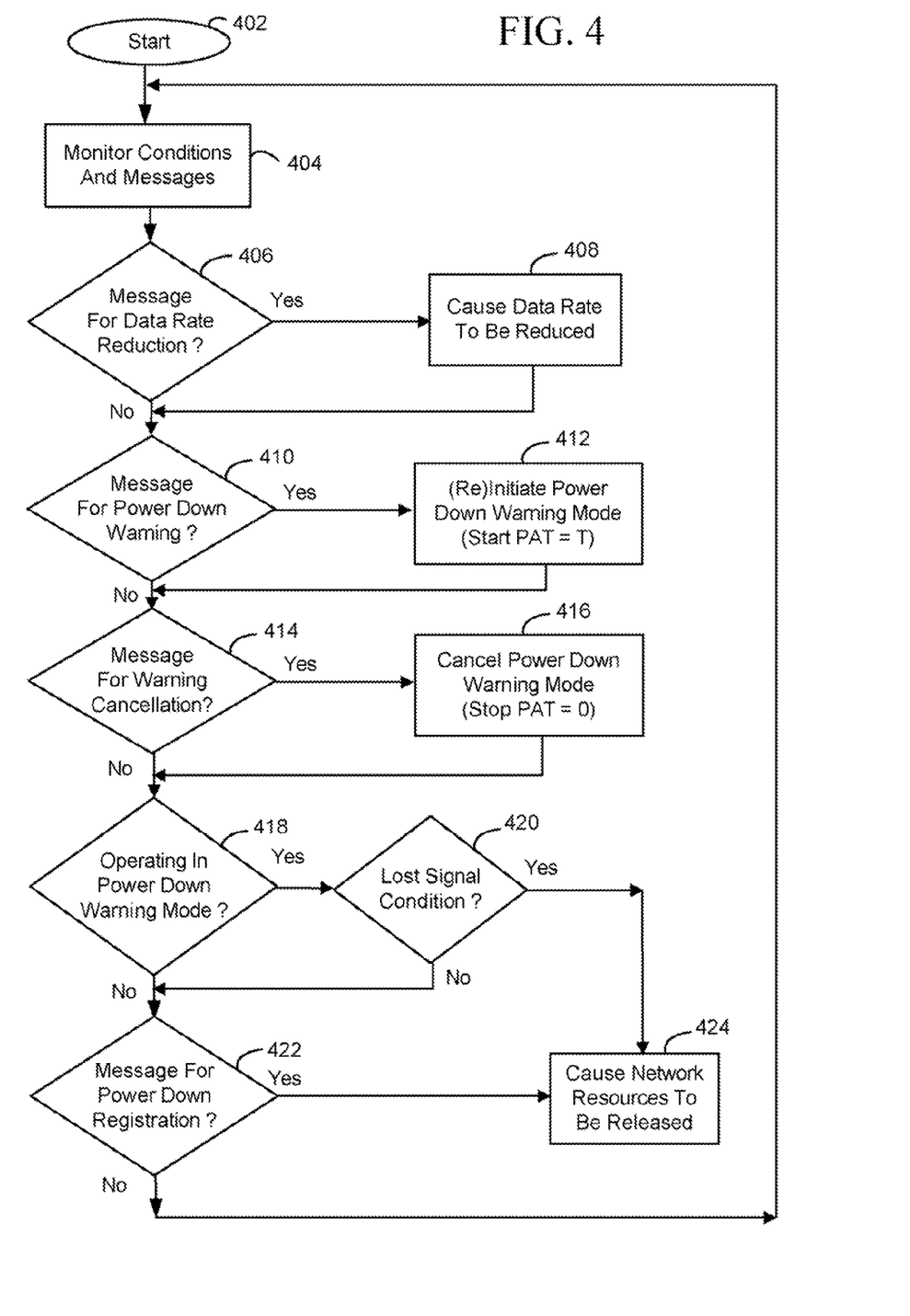
FIG. 4 is a flowchart for describing a method of expeditiously releasing network resources for a mobile station which is performed by a wireless network component.

FIG. 4 is a flowchart for describing a related method of expeditiously releasing network resources for a mobile station. The method of FIG. 4 may be performed in a wireless network by a wireless network component such as a network processor or server, and is associated with the flowchart of FIG. 3 which describes a method performed by the mobile station. The wireless network component may include one or more processors, memory, and computer instructions stored in the memory which are executable by the one or more processors to perform the method. A computer program product may include computer instructions stored on a computer storage medium (memory utilized by the one or more processors, a floppy disk or CD-ROM), which are written in accordance with the described logic.

Beginning at start block 402 of FIG. 4, the wireless network monitors for various conditions and messages received from a mobile station (step 404). A test is performed to identify whether a control message for data rate reduction has been received from the mobile station (step 406). If the message for data rate reduction has been received at step 406, then the wireless network causes a data rate for one or more packet data services utilized by the mobile station to be reduced (step 408). Note that a lower data rate conserves battery power at the mobile station. As some examples, the control message may cause a data rate for packet data communications to be reduced to 76.8 kbps from 153.6 kbps; or a data rate for voice communications to be reduced to 8 kbps from 13 kbps. The message may be received only if the data rate has not been reduced already or, alternatively, may be received even if redundant (i.e. already received previously) to ensure that the data rate is kept low.

Note that, although not explicitly detailed in the flowchart of FIG. 4, the wireless network may also receive a control message for an increase in the packet data rate when the battery condition of the mobile station becomes acceptable. Alternatively, the wireless network may increase the allowable packet data rate after an expiration of timer during which no message for packet data rate reduction is received from the mobile station. The packet data rate increase increases the data rate for the one or more packet data services to its originally intended data rate.

Moving ahead in FIG. 4, a test is performed to identify whether a control message which indicates a power down warning has been received from the mobile station (step 410). As previously described, the power down warning message is indicative of the low battery condition at the mobile station and is typically sent as an in-traffic channel message during a traffic call. Alternatively, the power down warning message may be sent over an access channel, an enhanced access channel, or a common control channel during an idle or dormant operating state of the mobile station. The message may be in any suitable form and be suitably named, for example, as a Power Down Warning message, a Low Battery Alert message, a Battery Status message which includes data identifying the low battery condition, etc. Regardless of the form or name, the power down warning message is used for causing the wireless network to release network resources for the mobile station if a lost signal condition between the mobile station and the wireless network is subsequently identified, as will be revealed in subsequent steps of FIG. 4.

If a power down warning message is received at step 410, then a power down warning mode for the mobile station is initiated by the wireless network (step 412). When this mode is initiated, a PAT timer is set to a predetermined value T which may be provided for in the power down warning message from the mobile station. This PAT timer may be utilized later to test whether there is a lost signal condition with the mobile station and the wireless network. Next, a test is performed to identify whether a control message which indicates a power down warning cancellation has been received from the mobile station (step 414). This power down warning cancellation message is indicative of an improved battery condition at the mobile station. If the power down warning cancellation message has been received as identified at step 414, then the power down warning mode is terminated for the mobile station and the PAT timer is stopped (step 416).

Next, a test is performed to identify whether the mobile station is in a power down warning mode (step 418). If the mobile station is in the power down warning mode at step 418, then a test is performed to determine whether a lost signal condition exists between the mobile station and the wireless network (step 420). If the lost signal condition exists with the mobile station at step 420, then the wireless network causes network resources for the mobile station to be released (step 424). Note that in step 424 the wireless network performs all of those procedures necessary, conventional or otherwise, to release network resources for the mobile station as if the wireless network has received a power down registration (or release order with power down indication) from the mobile station.

The test of step 420 may be performed in a few different ways depending on the operational mode of the mobile station. During traffic channel use, the lost signal condition may be based on a loss of RF signal and/or data communication over a predetermined period of time. If the signal or data communication is lost only for less than the predetermined time period, then no lost signal condition exists; conversely, if the signal or data communication is lost continuously over the predetermined time period or greater, then the lost signal condition exists. The predetermined period of time may be, for example, five (5) seconds which is a typical fade time. However, any suitable time period may be utilized. If the time period established is too short, the wireless network may incorrectly infer that the mobile station has powered down despite it merely going through a short temporary fade. If the time period established is too long, the wireless network will not release network resources for the mobile station as expeditiously as it should.

During idle mode operation or a dormant data session, the lost signal condition of step 420 may be determined by identifying whether a new or reissued power down warning message has been received from the mobile station by the wireless network within the time period defined by the PAT timer. If the time period defined by PAT timer expires before a new or reissued power down warning message has been received, then a lost signal condition with the mobile station is identified to exist. When conditions are normal, the PAT timer is reset to its default value each time a power down warning message is received from the mobile station.

If no power down warning mode is being maintained in step 418, or no lost signal condition exists at step 420, then the wireless network identifies whether a conventional power down registration or indication message has been received from the mobile station (step 422). If the power down registration message has been received at step 422, then the wireless network causes network resources for the mobile station to be released (step 424). The wireless network performs all of those procedures necessary, conventional or otherwise, to release network resources for the mobile station in response to the power down registration from the mobile station. When the wireless network causes network resources of the mobile station to be released, the mobile station is no longer available from the wireless network's perspective. The wireless network refrains from paging the mobile station when an incoming communication to the mobile station is received. Also, a previously-assigned IP address of the mobile station is deassigned from the mobile station and reallocated into the existing pool of available IP addresses.

Thus, although the wireless network is supposed to receive a power down registration in step 422 from the mobile station when it identifies a severe low battery condition, the mobile station may unintentionally power down before it can successfully transmit such a message. This may occur during a call or during transmission of the power down registration where the mobile station transmitter power is high enough so as to cause undesirable battery signal variations. It is for that situation the power down warning message at step 410 is particularly advantageous, so that the wireless network may subsequently infer from a lost signal condition that the mobile station has powered down due to low battery without successfully transmitting the power down registration/indication. In response, the wireless network expeditiously releases network resources associated with the mobile station. Otherwise, the network resources for the mobile station remain allocated even though the mobile station is inoperable, which is inefficient and wasteful of network resources.

In an alternate embodiment, a PAT timer is not utilized. This is a degenerated special case where the PAT timer may be viewed as having a value of infinity. In this case, the sending of the power down warning message is performed only when there is an active traffic channel for the mobile station, and the detection of a lost signal condition is based on a loss of the reverse link traffic signal over a persistent period of time (e.g. five seconds) without a normal release order being received. In another alternate embodiment, the PAT timers at both the mobile station and the wireless network are reset to the default value whenever there is any acknowledged signaling exchange between the mobile station and the wireless network, if the PAT timer has not expired.

Methods and apparatus for expeditiously releasing network resources for a mobile station based on low battery and lost signal conditions have been described. The wireless network receives a power down warning message from the mobile station indicative of a low battery condition. The wireless network then identifies whether a lost signal condition exists with the mobile station. In response to receiving the power down warning message and identifying the lost signal condition, the wireless network causes network resources for the mobile station to be released. The wireless network infers that the mobile station has powered down due to low battery without enough time to send a power down registration to the wireless network. Without use of techniques described herein, network resources for the mobile station remain allocated even though the mobile station is inoperable, which is inefficient and wasteful. In the mobile station, the method involves identifying whether a low battery condition exists. In response to identifying the low battery condition, the mobile station causes a power down warning message indicative of the low battery condition to be sent to the wireless communication network. The power down warning message is used for causing the wireless communication network to release network resources for the mobile station when a lost signal condition between the mobile station and the wireless communication network subsequently occurs.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. In a wireless communication network, a method of expeditiously releasing network resources for a mobile station comprising the acts of:
   receiving, from a mobile station, a message indicative of a low battery condition of the mobile station;
   running a timer;
   identifying that a lost signal condition exists between the mobile station and the wireless communication network upon failure to receive a transmission signal or a renewal or cancellation of the message indicative of the low battery condition from the mobile station within a predetermined time period defined by the timer;
   in the absence of receipt of a power down registration message communicated from the mobile station as part of a power down procedure when the mobile station is powered down, performing a power down registration procedure for the mobile station in response to receiving the message indicative of the low battery condition and identifying the lost signal condition, thereby to cause one or more network resources for the mobile station to be released.

2. The method of claim 1, further comprising:
   determining that the mobile station has shut down based on receiving the message indicative of the low battery condition and identifying the lost signal condition.

3. The method of claim 1, wherein causing the network resource to be released comprises refraining from paging the mobile station when an incoming communication to the mobile station is received in the wireless communication network.

4. The method of claim 1, wherein causing the network resource to be released comprises deassigning a previously-assigned IP address for the mobile station.

5. The method of claim 1, wherein the message indicative of the low battery condition includes a timer value which defines a time duration over which a power down warning indicated by the message indicative of the low battery condition is valid in the wireless communication network.

6. The method of claim 1, wherein the message indicative of the low battery condition comprises a control message.

7. The method of claim 1, further comprising:
   identifying the lost signal condition by failing to receive a radio frequency (RF) signal between the mobile station and the wireless communication network.

8. The method of claim 1, wherein the act of identifying that the lost signal condition exists comprises identifying that a loss of data communication with the mobile station exists.

9. The method of claim 1, further comprising:
   identifying the lost signal condition by failing to receive the renewal or cancellation of the message indicative of the low battery condition from the mobile station within the predetermined time period defined by the timer.

10. The method of claim 1, wherein the act of receiving the message indicative of the low battery condition comprises receiving the message indicative of the low battery condition while a traffic channel is established between the mobile station and the wireless communication network, the message indicative of the low battery condition being received as an in-traffic channel message.

11. The method of claim 1, wherein the act of receiving the message indicative of the low battery condition comprises receiving the message indicative of the low battery condition over one of an access channel and a common control channel.

12. A wireless network component for use in a wireless communication network, comprising:
   one or more processors;
   memory;
   the one or more processors including:
      a module for receiving, from a mobile station, a message indicative of a low battery condition of the mobile station;
      a module for running a timer;
      a module for identifying that a lost signal condition exists between the mobile station and the wireless communication network upon failure to receive a transmission signal or a renewal or cancellation of the message indicative of the low battery condition from the mobile station within a predetermined time period defined by the timer; and
      a module for, in the absence of receipt of a power down registration message communicated from the mobile station as part of a power down procedure when the mobile station is powered down, performing a power down registration procedure for the mobile station in response to receiving the message indicative of the low battery condition and identifying the lost signal condition, thereby to cause one or more network resources for the mobile station to be released.

13. The wireless network component of claim 12, wherein the one or more processors further include:
   a module for determining that the mobile station has powered down in response to receiving the message indicative of the low battery condition and identifying the lost signal condition.

14. The wireless network component of claim 12, further comprising:
   a module for refraining from paging the mobile station when an incoming communication to the mobile station is received in the wireless communication network after performing the power down registration procedure.

15. The wireless network component of claim 12, further comprising:
   a module for deassigning a previously-assigned IP address for the mobile station for releasing the one or more network resources.

16. The wireless network component of claim 12, wherein the message indicative of the low battery condition includes a timer value which defines a time duration over which a power down warning indicated by the message indicative of the low battery condition is valid in the wireless communication network.

17. The wireless network component of claim 12, wherein the message indicative of the low battery condition comprises a control message.

18. The wireless network component of claim 12, wherein the module for identifying the lost signal condition operates to identify that a loss of radio frequency (RF) signal between the mobile station and the wireless communication network exists.

19. The wireless network component of claim 12, wherein the module for identifying the lost signal condition operates to identify that a loss of data communication with the mobile station exists.

20. The wireless network component of claim 12, wherein the module for identifying the lost signal condition operates to identify the failure to receive the renewal or cancelation of the message indicative of the low battery condition from the mobile station within the predetermined time period defined by the timer.

21. The wireless network component of claim 12, wherein the module for receiving the message indicative of the low battery condition receives the message indicative of the low battery condition while a traffic channel is established between the mobile station and the wireless communication network, the message indicative of the low battery condition being received as an in-traffic channel message.

22. The wireless network component of claim 12, wherein the module for receiving the message indicative of the low battery condition receives the message indicative of the low battery condition over one of an access channel and a common control channel.

23. In a mobile station, a method of expeditiously releasing network resources in a wireless communication network comprising:
   identifying that a low battery condition exists in the mobile station;
   in response to identifying the low battery condition, causing a message indicative of the low battery condition to be sent to the wireless communication network;
   after causing the message indicative of the low battery condition to be sent, receiving insufficient power through a battery interface of the mobile station so as to power down without causing a power down registration message to be communicated to the wireless communication network which is communicated as part of a power down procedure when the mobile station is powered down; and
   the method being characterized in that the message indicative of the low battery condition indicates to the wireless communication network to perform a power down registration procedure for the mobile station when a lost signal condition for the mobile station is identified, upon failure to receive a transmission signal or a renewal or cancellation of the message indicative of the low battery condition from the mobile station within a predetermined time period defined by a timer in the wireless communication network, despite a failure of the wireless communication network to receive the power down registration message from the mobile station.

24. The method of claim 23, wherein the message indicative of the low battery condition includes a timer value which defines a time duration over which a power down warning indicated by the message indicative of the low battery condition is valid in the wireless communication network.

25. The method of claim 23, further comprising:
   regularly causing the message indicative of the low battery condition to be sent to the wireless communication network.

26. The method of claim 23, wherein the performing of the power down registration procedure causes the wireless communication network to refrain from paging the mobile station when an incoming communication to the mobile station is received in the wireless communication network.

27. The method of claim 23, wherein the message indicative of the low battery condition is sent as an in-traffic channel message.

28. The method of claim 23, wherein causing the message indicative of the low battery condition to be sent comprises causing the message indicative of the low battery condition to be sent while a traffic channel is established between the mobile station and the wireless communication network.

29. The method of claim 23, wherein the message indicative of the low battery condition is sent over one of an access channel and a common control channel.

30. The method of claim 23, wherein the performing of the power down registration procedure causes the wireless communication network to deassign a previously-assigned IP address for the mobile station.

31. The method of claim 23, wherein the low battery condition comprises a first low battery condition, the method further comprising:
identifying that a second low battery condition exists in the mobile station; and
in response to identifying the second low battery condition, causing a packet data rate reduction message to be sent to the wireless communication network.

32. The method of claim 23, wherein the low battery condition comprises a first low battery condition, the method further comprising:
identifying that a second low battery condition exists in the mobile station; and
in response to identifying the second low battery condition, causing a power down procedure to be performed which includes sending a power down registration or indication to the wireless communication network.

33. A mobile station, comprising:
a wireless transceiver;
an antenna coupled to the wireless transceiver;
one or more processors coupled to the wireless transceiver;
a battery interface to provide coupling to one or more batteries which supply power to the mobile station;
battery sensing circuitry coupled to the battery interface;
the one or more processors being operative to:
identify, via the battery sensing circuitry, that a low battery condition exists in the mobile station;
in response to identifying the low battery condition, cause a message indicative of the low battery condition to be sent through the wireless transceiver to the wireless communication network;
after causing the message indicative of the low battery condition to be sent, receive insufficient power through the battery interface so as to power down without causing a power down registration message to be communicated to the wireless communication network which is communicated as part of a power down procedure when the mobile station is powered down; and
the message indicative of the low battery condition being characterized in that it indicates to the wireless communication network to perform a power down registration procedure for the mobile station when a lost signal condition for the mobile station is identified, upon failure to receive a transmission signal or a renewal or cancellation of the message indicative of the low battery condition from the mobile station within a predetermined time period defined by a timer in the wireless communication network, despite a failure of the wireless communication network to receive the power down registration message from the mobile station.

34. The mobile station of claim 33, wherein the message indicative of the low battery condition includes a timer value which defines a time duration over which a power down warning indicated by the message indicative of the low battery condition is valid in the wireless communication network.

35. The mobile station of claim 33, wherein the one or more processors are further operative to regularly cause the message indicative of the low battery condition to be sent to the wireless communication network.

36. The mobile station of claim 33, wherein the performing of the power down registration procedure causes the wireless communication network to refrain from paging the mobile station when an incoming communication to the mobile station is received in the wireless communication network.

37. The mobile station of claim 33, wherein the message indicative of the low battery condition being sent as an in-traffic channel message.

38. The mobile station of claim 33, wherein causing the message indicative of the low battery condition to be sent comprises causing the message indicative of the low battery condition to be sent while a traffic channel is established between the mobile station and the wireless communication network.

39. The mobile station of claim 33, wherein the message indicative of the low battery condition is transmitted over one of an access channel and a common control channel.

40. The mobile station of claim 33, wherein the performing of the power down registration procedure causes the wireless communication network to deassign a previously-assigned IP address for the mobile station.

41. The mobile station of claim 33, wherein the low battery condition comprises a first low battery condition, the one or more processors being further operative to:
identify that a second low battery condition exists in the mobile station; and
in response to identifying the second low battery condition, cause a packet data rate reduction message to be sent to the wireless communication network.

42. The mobile station of claim 33, wherein the low battery condition comprises a first low battery condition, the one or more processors being further operative to:
identify that a second low battery condition exists in the mobile station; and
in response to identifying the second low battery condition, cause a power down procedure to be performed which includes sending a power down registration to the wireless communication network.

* * * * *